May 22, 1934.　　　　F. L. BOLT　　　　1,959,521
AIR DIRECTOR FOR LIQUID FUEL OR POWDERED FUEL FURNACES
Filed April 27, 1931　　2 Sheets-Sheet 1
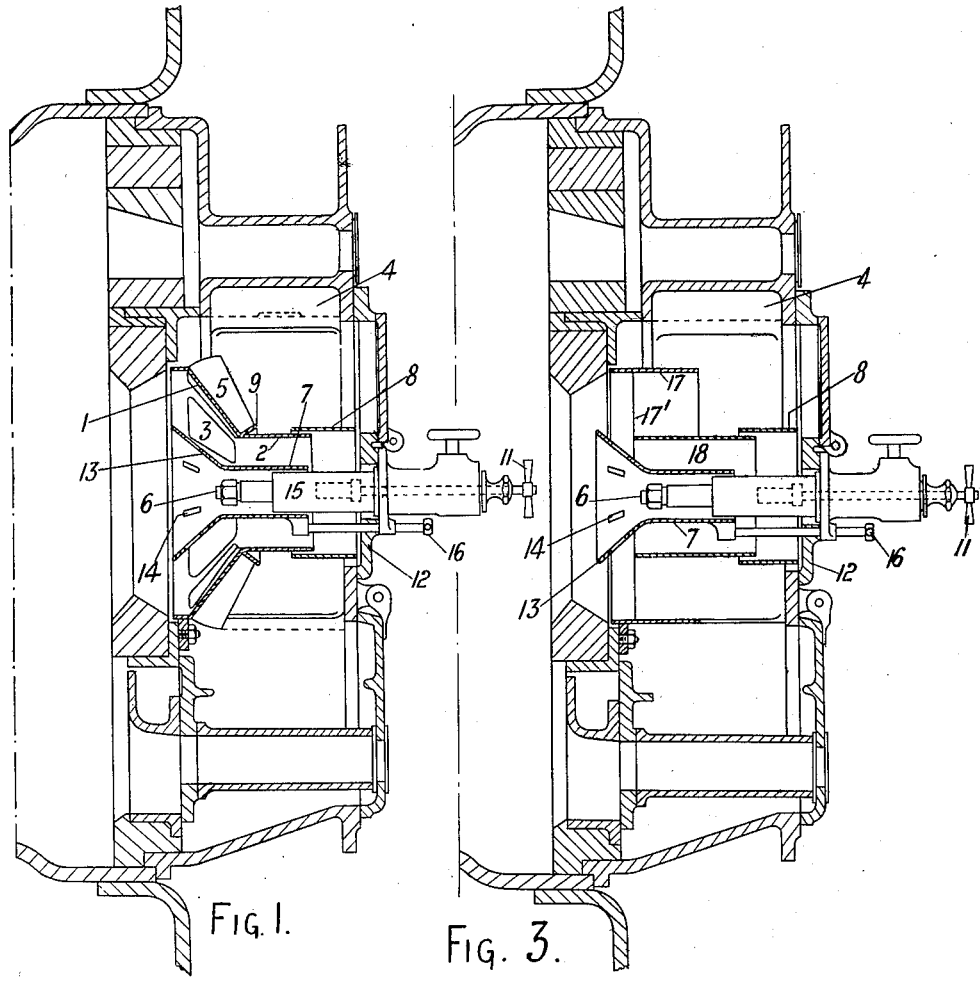
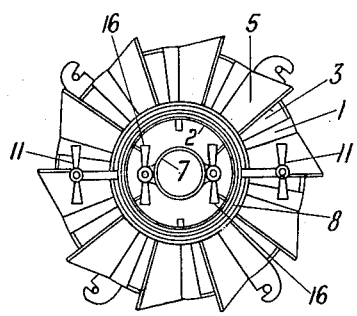
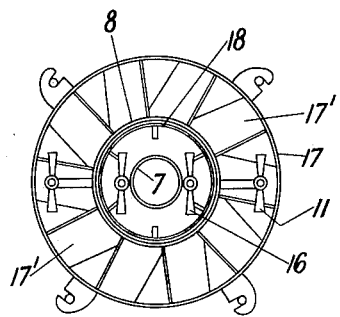
Inventor
Frederic Leslie Bolt May 22, 1934.   F. L. BOLT   1,959,521
AIR DIRECTOR FOR LIQUID FUEL OR POWDERED FUEL FURNACES
Filed April 27, 1931   2 Sheets-Sheet 2

Inventor
Frederic Leslie Bolt
By
Pennie Davis Marvin & Edmonds
attorneys

Patented May 22, 1934

1,959,521

UNITED STATES PATENT OFFICE 1,959,521

AIR DIRECTOR FOR LIQUID FUEL OR POWDERED FUEL FURNACES

Frederic Leslie Bolt, Tynemouth, England

Application April 27, 1931, Serial No. 533,228
In Great Britain March 21, 1931

1 Claim. (Cl. 158—1.5)

This invention relates to air directors for liquid fuel or powdered fuel furnaces and has for its primary object to effect wide control of the localization of combustion.

According to the present invention there is fitted for axial movement within a cylindrical structure or the cylindrical part of a cylindro-conical structure coaxial with the burner tube a flame tube by means of which entrance of air to the furnace through the said cylindrical structure or part can be sealed, thus compelling all the air to enter the furnace between vanes external to the said cylindrical structure or part, and concentrating the flame at the furnace front. When air is given access to the furnace through the cylindrical structure or part by pushing the flame tube forward towards the furnace, air enters through this part without any swirl, throwing the flame further into the furnace but without risk of the flame leaving the burner although the vortex caused by the swirl is largely destroyed.

Figure 5:
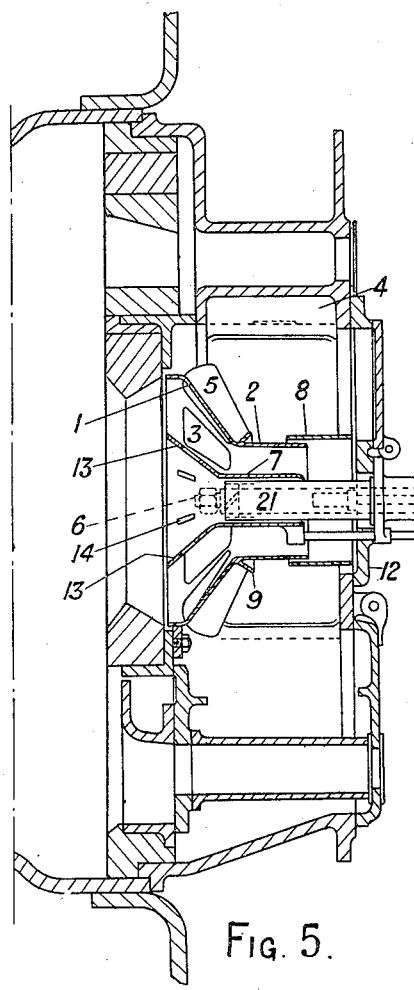
Figure 7:
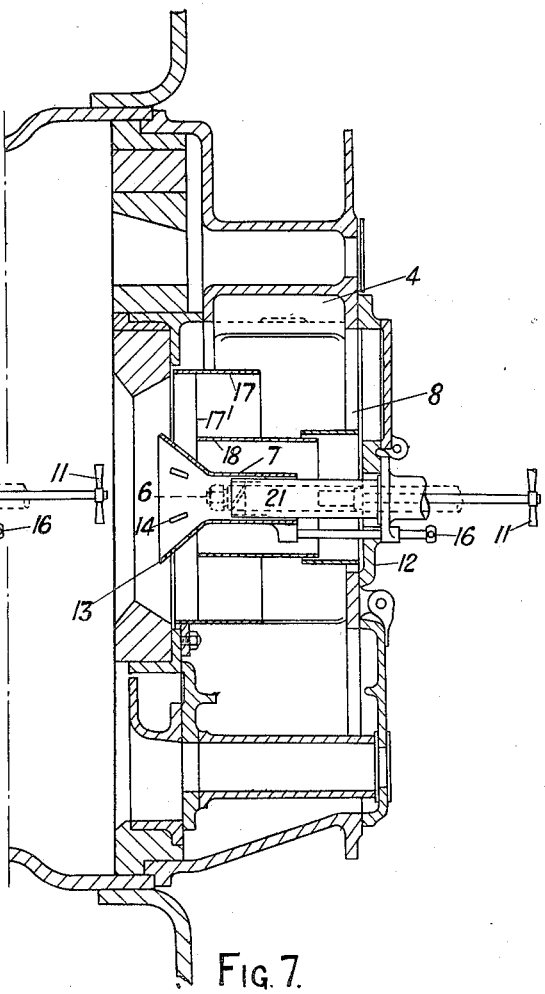
Figure 6:
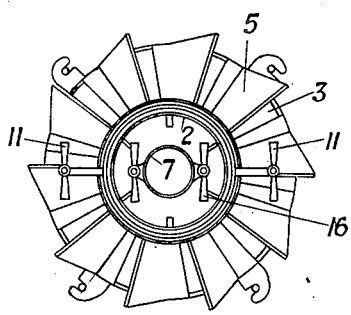
Figure 8:
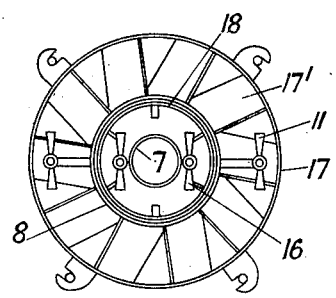

In the accompanying drawings Fig. 1 is a longitudinal section and Fig. 2 an end view showing the adaptation to a boiler furnace of an air director embodying the present invention. Figs. 3 and 4 are corresponding views illustrating a modified construction. Figs. 5 and 6 are views similar to Figs. 1 and 2 illustrating another modification. Figs. 7 and 8 are similar views illustrating yet another modification.

The air director shown includes a hollow cylindro-conical structure having a truncated conical part 1 diverging in the direction of the flow of air and a cylindrical part 2. The part 1 is provided with slots 3 affording communication between the furnace and the air casing or reservoir 4. The part 1 is also provided with external vanes 5 disposed alongside the slots 3 and designed to impart a predetermined whirling movement to the air entering the furnace. The cylindrical part 2 surrounds the burner 6 and the cylindrical part 7 of a movable flame cone extending into the air casing or reservoir 4 for cooperation with a valve 8.

At the ends of the slots 3 remote from the furnace is a ring 9 designed to impede the flow of air towards the furnace in the direction parallel with the axis of the director.

The valve 8 is constituted by a sleeve in telescopic relation with the cylindrical part 2 and is adapted to be moved axially by manipulation of handles 11 disposed externally of the air casing or reservoir 4, so as to permit regulation of the distance between the outer end of the sleeve and the inner face of the frontplate 12.

13 denotes the flame cone proper unitary with the cylindrical part 7 and diverging in the direction of the flow of air. The cone 13 is provided with slots 14.

The cylindro-conical member 7, 13 is telescopically mounted on the burner-carrier 15 and is movable axially by manipulation of externally disposed handles 16 whereby to permit regulation of the distance between the part 1 of the air director and the cone 13.

In the operation of the air director air entering the furnace is guided by the vanes 5 and, passing through the slots 3, entrains fine particles of liquid or powdered fuel issuing from the burner 6, the action of the vanes 5 being such that the paths of the fuel and of the flame in a furnace of circular section are spiral.

To control the localization of combustion the valve 8 is operated to admit air into the furnace by way of the hollow cylindrical part 2, and the whirling movement imparted by the vanes 5 is slightly or wholly neutralized by moving the flame cone 13 so as to increase or decrease the gap between it and the part 1 of the air director. By increasing this gap the flame is thrown further forward into the furnace without risk of the flame blowing off the burner. If the gap is entirely closed, the flame is brought right back to the tip of the burner.

The modified construction shown in Figs. 3 and 4 includes coaxial annular shells 17 and 18 of unequal diameters of which the shell 17 of larger diameter is provided with internal vanes 17¹ designed to impart a predetermined whirling movement to the air and of which the shell 18 houses a movable flame cone 7, 13 by axial movement of which entrance of air to the furnace through the shell 18 of smaller diameter can be sealed.

Figs. 5 and 6 show an arrangement similar to that indicated in Figs. 1 and 2 except that instead of being mounted on the burner carrier 15 the flame cone is mounted on the powdered fuel burner 21, adjustments for the localization of combustion being precisely similar to those described with reference to Figs. 1–4.

As shown also in Fig. 5 a liquid fuel burner 6 may be fitted within the powdered fuel burner 21 so that the furnace may be readily converted from liquid fuel firing to powdered fuel firing and vice versa in a very short space of time without necessity for alteration to the furnace other than the fitting or removal of the oil burner.

Figs. 7 and 8 show an air director similar to that shown in Figs. 3 and 4 but fitted with a powdered fuel burner 21 within which may be fitted a liquid fuel burner 6 as in the arrangement described with reference to Figs. 5 and 6.

What is claimed is:—

In a furnace for burning liquid or powdered fuel, having a furnace mouth opening, in combination with a burner, a carrier for said burner, an axially adjustable cylindroconical member, the conical part of which constitutes a flame cone provided with slots and the cylindrical part of which surrounds said burner carrier, an intermediate member coaxial with said first mentioned member, and separated therefrom by a vaneless space, a sleeve valve slidable on and exteriorly of said intermediate member and adapted to control the flow of air therethrough, and an annular member located around the furnace mouth opening and extending outwardly therefrom, said annular member presenting air passages separated by vanes adapted to impart a whirling movement to air entering the furnace opening through said passages between said annular member and said flame-cone, the range of adjustment of said flame-cone permitting said cone to be moved sufficiently far to close the inner end of the gap between said cylindrical part and said intermediate member.

FREDERIC LESLIE BOLT.